(12) United States Patent
Niimi et al.

(10) Patent No.: US 11,034,258 B2
(45) Date of Patent: Jun. 15, 2021

(54) POWER SUPPLY FOR VEHICLE AND CONTROL METHOD OF POWER SUPPLY

(71) Applicant: TOYOTA JIDOSHA KABUSHIKI KAISHA, Toyota (JP)

(72) Inventors: Yoshitaka Niimi, Susono (JP); Naoyoshi Takamatsu, Shizuoka-ken (JP); Shunya Kobayashi, Gotemba (JP); Satoru Ito, Numazu (JP); Takuya Sakamoto, Susono (JP); Hirotsugu Ohata, Susono (JP); Naoki Yanagizawa, Nagakute (JP); Shuji Tomura, Nagakute (JP); Shigeaki Goto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 16/672,641

(22) Filed: Nov. 4, 2019

(65) Prior Publication Data
US 2020/0148074 A1  May 14, 2020

(30) Foreign Application Priority Data

Nov. 9, 2018  (JP) .............................. JP2018-211657

(51) Int. Cl.
| | | |
|---|---|---|
| *B60L 58/19* | (2019.01) | |
| *B60L 50/60* | (2019.01) | |
| *H02J 7/00* | (2006.01) | |
| *H02M 3/158* | (2006.01) | |
| *B60K 6/28* | (2007.10) | |
| *H02P 27/06* | (2006.01) | |

(52) U.S. Cl.
CPC .............. *B60L 58/19* (2019.02); *B60L 50/60* (2019.02); *H02J 7/0024* (2013.01); *H02M 3/158* (2013.01); *B60K 6/28* (2013.01); *B60L 2210/10* (2013.01); *B60Y 2200/91* (2013.01); *B60Y 2200/92* (2013.01); *H02P 27/06* (2013.01)

(58) Field of Classification Search
CPC ...... B60L 58/19; B60L 50/60; B60L 2210/10; B60L 2240/547; B60L 2220/14; H02M 3/158; B60K 6/28; B60Y 2200/91; B60Y 2200/92; H02P 27/06; Y02T 90/14; Y02T 10/7072; Y02T 10/92; Y02T 10/70; H02J 7/36; H02J 7/0024
USPC .......................................... 307/9.1, 10.1, 26
See application file for complete search history.

(56) References Cited

U.S. PATENT DOCUMENTS

| | | | | |
|---|---|---|---|---|
| 2008/0174274 | A1* | 7/2008 | Kosaka ................. | H02J 7/0016 320/117 |
| 2014/0084879 | A1* | 3/2014 | Kurokawa ............ | H02M 3/158 323/234 |

FOREIGN PATENT DOCUMENTS

JP          2014-064416 A          4/2014

* cited by examiner

Primary Examiner — Toan T Vu
(74) *Attorney, Agent, or Firm* — Sughrue Mion, PLLC

(57) ABSTRACT

A power supply of a vehicle includes a first switching element, a second switching element, a third switching element, a first battery, a reactor element, a second battery, a smoothing capacitor, and a controller. When the connection state of the first battery and the second battery is switched from the series connection state to the parallel connection state, the controller is configured to perform a transition control so that a voltage of the smoothing capacitor is decreased to the higher of a voltage of the first battery and a voltage of the second battery, and perform a switching control to turn on the first switching element after a diode of the first switching element is energized.

5 Claims, 5 Drawing Sheets

POWER SUPPLY FOR VEHICLE AND CONTROL METHOD OF POWER SUPPLY

INCORPORATION BY REFERENCE

The disclosure of Japanese Patent Application No. 2018-211657 filed on Nov. 9, 2018 including the specification, drawings and abstract is incorporated herein by reference in its entirety.

BACKGROUND

1. Technical Field

The disclosure relates to a power supply for a vehicle and a control method of a power supply. The power supply is configured to switch a connection state of two batteries between a series connection state and a parallel connection state.

2. Description of Related Art

Japanese Unexamined Patent Application Publication No. 2014-064416 (JP 2014-064416 A) describes a power supply including two batteries and a reactor element. A connection state of the two batteries can be switched between a series connection state and a parallel connection state by controlling the switching element. The reactor element is connected in series with one of the two batteries.

SUMMARY

In the power supply described in JP 2014-064416 A, when the connection state of the two batteries is switched from the series connection state to the parallel connection state, a voltage of the battery to which the reactor element is connected may be higher than that of the other battery. In this case, an inrush current may occur in the other battery.

The disclosure provides a power supply for a vehicle and a control method of a power supply, which can restrain an inrush current from occurring when the connection state of two batteries is switched from a series connection state to a parallel connection state.

A first aspect of the disclosure relates to a power supply for a vehicle. The power supply includes a first switching element, a second switching element, a third switching element, a first battery, a reactor element, a second battery, a smoothing capacitor, and a controller. The first switching element is connected between a positive line and a first node. The second switching element is connected between the first node and a second node. The third switching element is connected between the second node and a negative line. The first battery has a positive electrode and a negative electrode connected to the first node and the negative line, respectively. The reactor element is connected between the positive line and a third node. The second battery has a positive electrode and a negative electrode connected to the third node and the second node, respectively. The smoothing capacitor is connected between the positive line and the negative line. The controller is configured to switch each of the first switching element, the second switching element, and the third switching element between an ON state and an OFF state to switch a connection state of the first battery and the second battery between a series connection state and a parallel connection state. When the connection state of the first battery and the second battery is switched from the series connection state to the parallel connection state, the controller is configured to perform a transition control so that a voltage of the smoothing capacitor is decreased to the higher of a voltage of the first battery and a voltage of the second battery and perform a switching control to turn on the first switching element after a diode of the first switching element is energized. The transition control is a control to alternately turn on and turn off the second switching element and the third switching element while making an ON duration of the second switching element shorter and an ON duration of the third switching element longer with passage of time.

In the power supply according to the above aspect, the controller may be configured to control the first switching element and the third switching element to the OFF state and control the second switching element to the ON state so that the connection state of the first battery and the second battery becomes the series connection state, and the controller may be configured to control the first switching element and the third switching element to the ON state and control the second switching element to the OFF state so that the connection state of the first battery and the second battery becomes the parallel connection state.

In the power supply according to the above aspect, the controller may be configured to perform the switching control when the voltage of the first battery is lower than the voltage of the second battery.

In the power supply according to the above aspect, the controller may be configured to maintain the connection state of the first battery and the second battery as the series connection state when the diode of the first switching element is not energized.

A second aspect of the disclosure relates to a control method of a power supply. The power supply includes a first switching element, a second switching element, a third switching element, a first battery, a reactor element, a second battery, a smoothing capacitor, and a controller. The first switching element is connected between a positive line and a first node. The second switching element is connected between the first node and a second node. The third switching element is connected between the second node and a negative line. The first battery has a positive electrode and a negative electrode connected to the first node and the negative line, respectively. The reactor element is connected between the positive line and a third node. The second battery has a positive electrode and a negative electrode connected to the third node and the second node, respectively. The smoothing capacitor is connected between the positive line and the negative line. The control method includes: switching, by the controller, each of the first switching element, the second switching element, and the third switching element between an ON state and an OFF state to switch a connection state of the first battery and the second battery between a series connection state and a parallel connection state; and when the connection state of the first battery and the second battery is switched from the series connection state to the parallel connection state, performing, by the controller, a transition control so that a voltage of the smoothing capacitor is decreased to the higher of a voltage of the first battery and a voltage of the second battery and performing, the controller, a switching control to turn on the first switching element after a diode of the first switching element is energized. The transition control is a control to alternately turn on and turn off the second switching element and the third switching element while making an ON duration of the second switching element shorter and an ON duration of the third switching element longer with passage of time.

In the power supply according to the above aspect, the transition control is performed so that the voltage of the smoothing capacitor is decreased to the higher of the voltage of the first battery and the voltage of the second battery. The transition control is a control to alternately turn on and turn off the second switching element and the third switching element while making the ON duration of the second switching element shorter and the ON duration of the third switching element longer with the passage of time. After the diode of the first switching element is energized, the first switching element is turned on. Thus, it is possible to suppress generation of the inrush current when the connection state of the two batteries is switched from the series connection state to the parallel connection state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a configuration of a power supply for a vehicle according to an embodiment of the disclosure will be described with reference to the drawings.

Configuration of Vehicle

First, with reference to FIG. 1, a configuration of a vehicle to which the power supply for a vehicle according to the embodiment of the disclosure is applied will be described.

Figure 1:
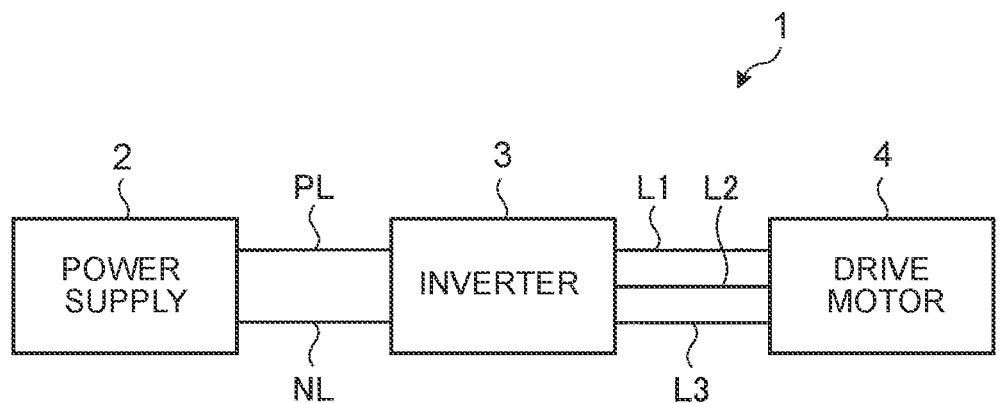
FIG. 1 is a block diagram showing a configuration of a vehicle to which a power supply for a vehicle according to an embodiment of the disclosure is applied.

FIG. 1 is a block diagram showing the configuration of the vehicle to which the power supply for a vehicle according to the embodiment of the disclosure is applied. As shown in FIG. 1, a vehicle 1 to which the power supply for a vehicle according to the embodiment of the disclosure is applied is a hybrid vehicle (HV), an electric vehicle (EV), a plug-in hybrid vehicle (PHV), or a fuel cell electric vehicle (FCEV), for example. The vehicle 1 includes a power supply 2, an inverter 3, and a drive motor 4.

The power supply 2 is connected to the inverter 3 via a positive line PL and a negative line NL, and has a function of charging and discharging electric power with the inverter 3 in accordance with a control signal from a control device such as an electronic control unit (ECU), not shown.

The inverter 3 is connected to the drive motor 4 through wirings L1, L2, L3, and has a function of converting between direct-current (DC) power and alternating-current (AC) power. In the present embodiment, the inverter 3 converts DC power supplied from the power supply 2 into AC power and supplies the AC power to the drive motor 4, and converts AC power generated by the drive motor 4 into DC power and supplies the DC power to the power supply 2. A plurality of inverters 3 may be provided.

The drive motor 4 includes a synchronous motor/generator. The drive motor 4 is driven by AC power supplied from the inverter 3 to function as a motor for driving a vehicle, and also functions as a generator that generates AC power using the driving power of the vehicle.

Configuration of Power Supply

Next, the configuration of the power supply 2 will be described with reference to FIG. 2.

Figure 2:
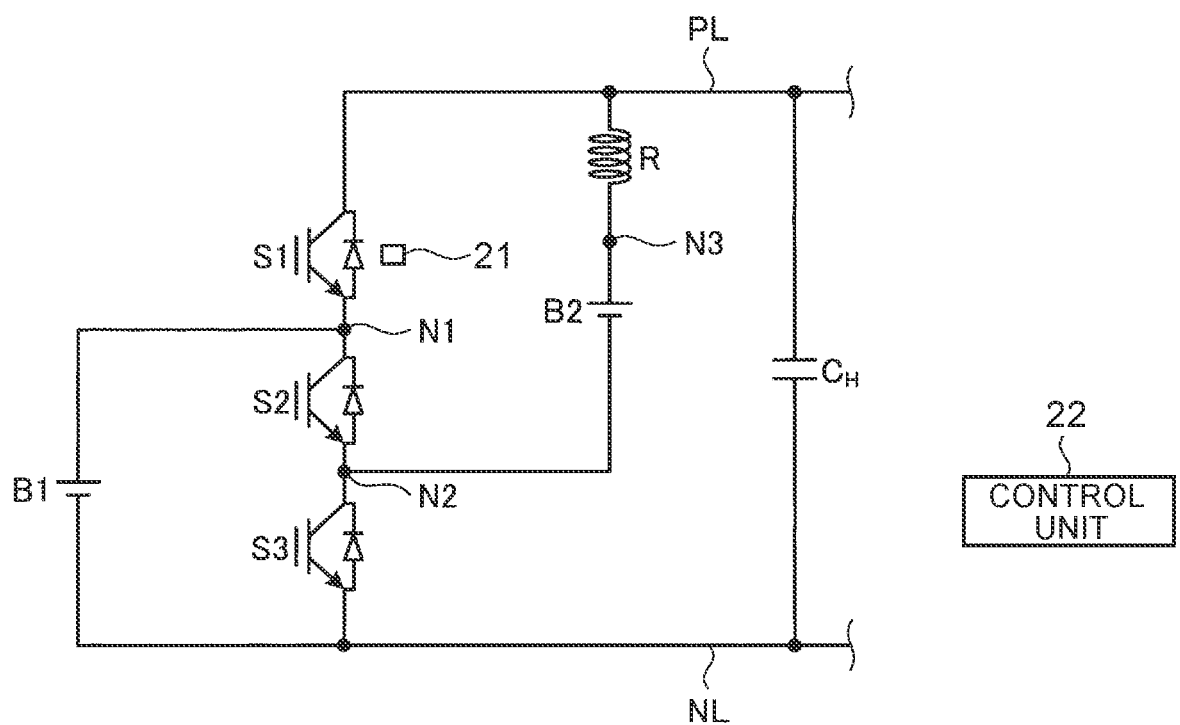
FIG. 2 is a circuit diagram showing a configuration of the power supply shown in FIG. 1.

FIG. 2 is a circuit diagram showing the configuration of the power supply 2 shown in FIG. 1. As shown in FIG. 2, the power supply 2 includes a first switching element S1, a second switching element S2, a third switching element S3, a first battery B1, a reactor element R, a second battery B2, and a smoothing capacitor $C_H$. The first switching element S1 is connected between the positive line PL and a first node N1. The second switching element S2 is connected between the first node N1 and a second node N2. The third switching element S3 is connected between the second node N2 and the negative line NL. The first battery B1 has a positive electrode and a negative electrode connected to the first node N1 and the negative line NL, respectively. The reactor element R is connected between the positive line PL and the third node N3. The second battery B2 has a positive electrode and a negative electrode connected to the third node N3 and the second node N2, respectively. The smoothing capacitor $C_H$ is connected between the positive line PL and the negative line NL. The power supply 2 includes, as its control system, a current sensor 21 that detects a diode current of the first switching element S1 and a controller 22 that controls operation of the power supply 2. The controller 22 is an example of a controller.

Each of the first switching element S1, the second switching element S2, and the third switching element S3 is a semiconductor switching element. As the semiconductor switching element, an insulated gate bipolar transistor (IGBT) is used. A diode (rectifier) is connected between a collector terminal and an emitter terminal of the IGBT, with its anode connected to the emitter terminal. In the case where a semiconductor switching element other than IGBTs is used, the diode is connected in parallel with the semiconductor switching element so that a current flows in a direction opposite to the direction in which the current flows when the switching element is conducted. The diode may be a parasitic diode associated with the semiconductor switching element. In this specification, a combination of a semiconductor switching element and a diode is referred to as a switching element.

In the power supply 2, the controller 22 controls an ON state and an OFF state of each of the first switching element S1, the second switching element S2, and the third switching element S3, so that the connection state of the first battery B1 and the second battery B2 can be switched between the series connection state and the parallel connection state. Specifically, when the controller 22 controls the first switching element S1 and the third switching element S3 to the OFF state and controls the second switching element S2 to the ON state, the first battery B1 and the second battery B2 are connected in series. When the controller 22 controls the first switching element S1 and the third switching element S3 to the ON state and controls the second switching element S2 to the OFF state, the first battery B1 and the second battery B2 are connected in parallel.

In the power supply 2 having such a configuration, when the connection state of the first battery B1 and the second battery B2 is switched from the series connection state to the parallel connection state, the controller 22 performs a series/parallel switching transition control, so that a voltage VH of the smoothing capacitor $C_H$ is decreased to the higher of a voltage VB1 of the first battery B1 and a voltage VB2 of the second battery B2. In the series/parallel switching transition control, the controller 22 alternately turns on and turns off the second switching element S2 and the third switching element S3 while making an ON duration of the second switching element S2 shorter and an ON duration of the third switching element S3 longer with passage of time. Then, the controller 22 turns on the first switching element S1 after the series/parallel switching transition control is completed.

Figure 3A:
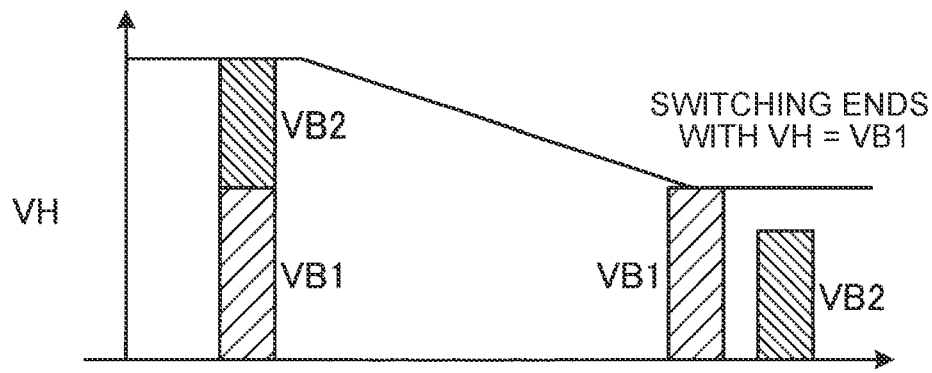
FIG. 3A is a diagram showing a voltage of a smoothing capacitor before and after a series/parallel switching control when a voltage of a first battery is higher than that of a second battery.
Figure 3B:
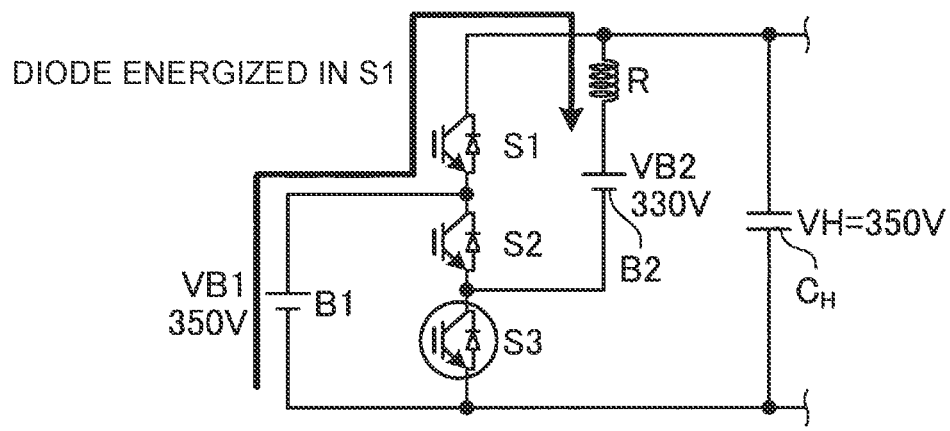
FIG. 3B is a circuit diagram showing a flow of a current at the time when the series/parallel switching control is completed in FIG. 3A.
Figure 3C:
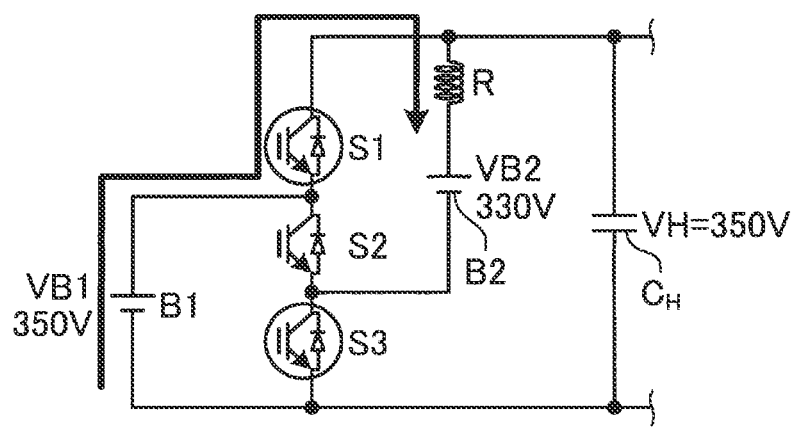
FIG. 3C is a circuit diagram showing a flow of a current at the time when a first switch is turned on after the series/parallel switching control is completed in FIG. 3A.
Figure 4A:
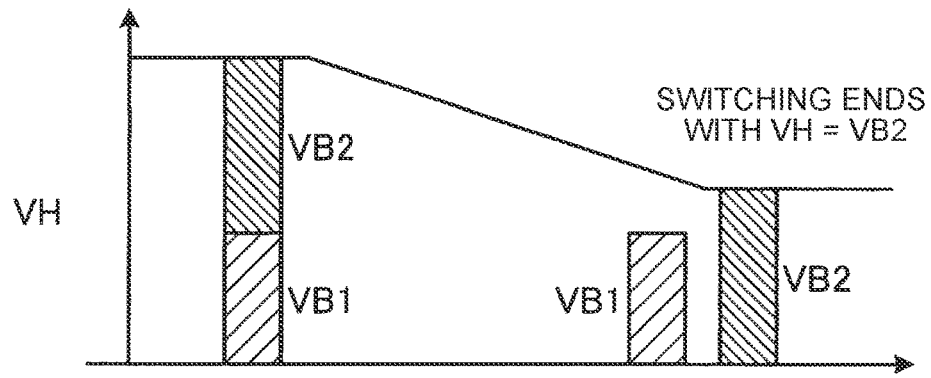
FIG. 4A is a diagram showing the voltage of the smoothing capacitor before and after the series/parallel switching control when the voltage of the first battery is lower than that of the second battery.
Figure 4B:
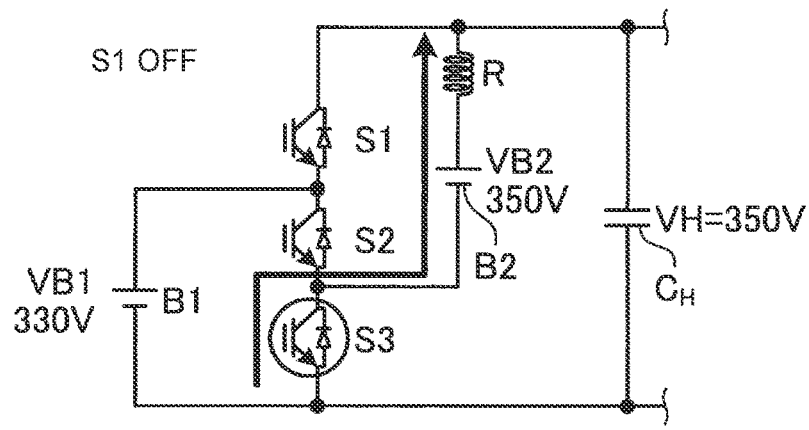
FIG. 4B is a circuit diagram showing the flow of the current at the time when the series/parallel switching control is completed in FIG. 4A.
Figure 4C:
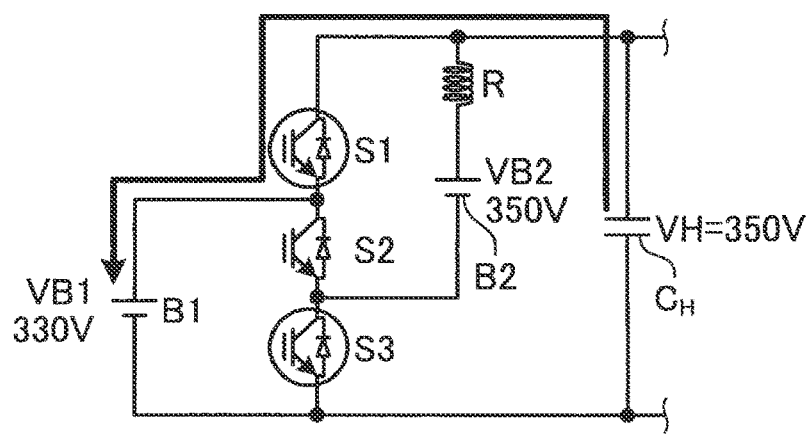
FIG. 4C is a circuit diagram showing the flow of the current at the time when the first switch is turned on after the series/parallel switching control is completed in FIG. 4A.

As shown in FIGS. 3A to 3C, when the voltage VB1 of the first battery B1 is higher than the voltage VB2 of the second battery B2, the diode of the first switching element S1 is energized so that a current flows from the first battery B1 toward the second battery B2. At this time, since there is the reactor element R on the second battery B2 side, no inrush current occurs when the first switching element S1 is turned on. However, as shown in FIGS. 4A to 4C, when the voltage VB1 of the first battery B1 is lower than the voltage VB2 of the second battery B2, an inrush current flows from the smoothing capacitor $C_H$ toward the first battery B1 at the moment when the first switching element S1 is turned on, since there is no reactor element R between the first switching element S1 and the smoothing capacitor $C_H$. FIGS. 3A and 4A show the voltage VB1 of the first battery B1 and the voltage VB2 of the second battery B2 before and after execution of the series/parallel switching transition control.

In the power supply for a vehicle according to the embodiment of the disclosure, the controller 22 performs a series/parallel switching control described below, so as to restrain the inrush current from occurring when the connection state of the first battery B1 and the second battery B2 is switched from the series connection state to the parallel connection state. Operation of the controller 22 during execution of the series/parallel switching control will be described below with reference to FIGS. 5, 6A and 6B.

Series/Parallel Switching Control

Figure 5:
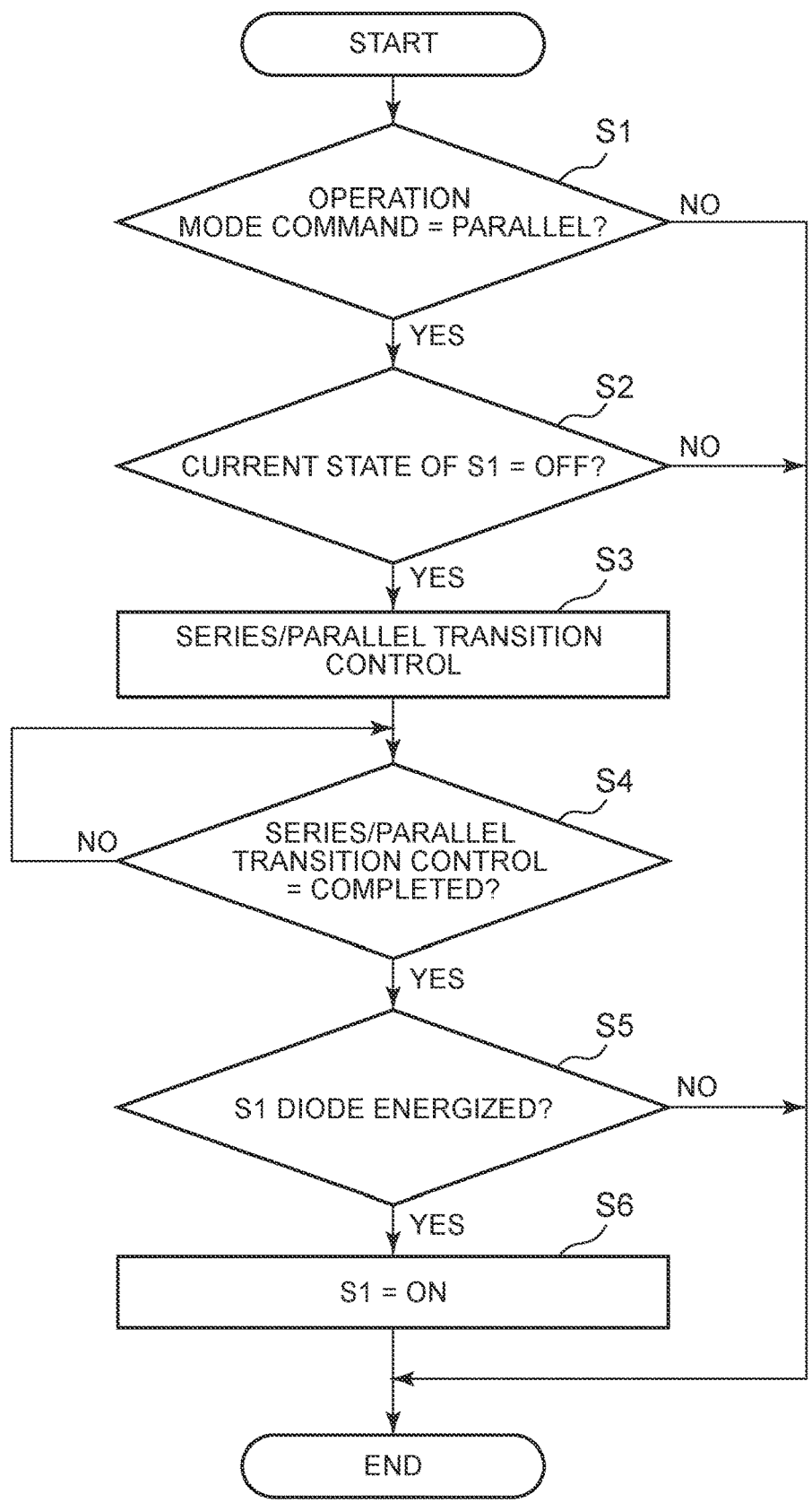
FIG. 5 is a flowchart showing a flow of the series/parallel switching control according to the embodiment of the disclosure.
Figure 6A:
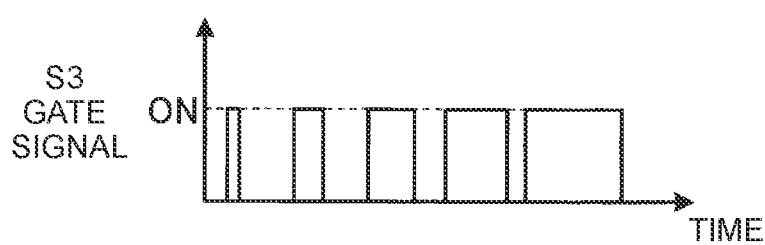
FIG. 6A is diagram for explaining an operation in step S3 shown in FIG. 5.
Figure 6B:
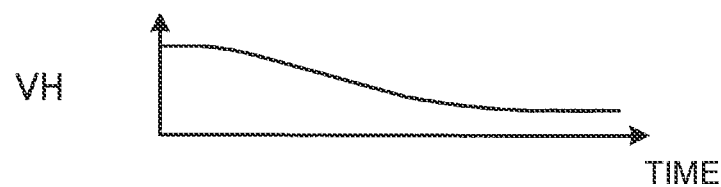
FIG. 6B is diagram for explaining an operation in step S3 shown in FIG. 5.

FIG. 5 is a flowchart showing a flow of the series/parallel switching control according to the embodiment of the disclosure. FIGS. 6A and 6B are diagrams for explaining an operation in step S3 shown in FIG. 5. In the flowchart of FIG. 5, the series/parallel switching control starts at the timing when an ignition switch of the vehicle 1 is switched from an OFF state to an ON state, and the process proceeds to step S1.

In step S1, the controller 22 determines whether an operation mode command to the power supply 2 is the parallel connection state. As a result of the determination, when the operation mode command is the parallel connection state (step S1: Yes), the controller 22 proceeds with the series/parallel switching control to step S2. When the operation mode command is not the parallel connection state (step S1: No), the controller 22 terminates the sequence of the series/parallel switching control.

In step S2, the controller 22 determines whether the state of the first switching element S1 is the OFF state. As a result of the determination, when the state of the first switching element S1 is the OFF state (step S2: Yes), the controller 22 proceeds with the series/parallel switching control to step S3. When the state of the first switching element S1 is the ON state (step S2: No), the controller 22 terminates the sequence of the series/parallel switching control.

In step S3, as shown in FIGS. 6A and 6B, the controller 22 performs the series/parallel switching transition control, so that the voltage VH of the smoothing capacitor $C_H$ is decreased to the higher of the voltage VB1 of the first battery B1 and the voltage VB2 of the second battery B2. In the series/parallel switching transition control, the controller 22 alternately turns on and turns off the second switching element S2 and the third switching element S3 while making the ON duration of the second switching element S2 shorter and the ON duration of the third switching element S3 longer with the passage of time. Thus, the operation in step S3 is completed, and the series/parallel switching control proceeds to step S4.

In step S4, the controller 22 determines whether the series/parallel switching transition control is completed. As a result of the determination, when the series/parallel switching transition control is completed (step S4: Yes), the controller 22 proceeds with the series/parallel switching control to step S5. When the series/parallel switching transition control is not completed (step S4: No), the controller 22 executes the operation in step S4 again after a prescribed time has elapsed. Whether the series/parallel switching transition control is completed can be determined by detecting, for example, that the voltage VB1 of the first battery B1, the voltage VB2 of the second battery B2, and the output voltage VH of the power supply 2 have become the same.

In step S5, the controller 22 determines whether the diode of the first switching element S1 is energized based on a detection signal of the current sensor 21. As a result of the determination, when the diode of the first switching element S1 is energized (step S5: Yes), the controller 22 proceeds with the series/parallel switching control to step S6. When the diode of the first switching element S1 is not energized (step S5: No), the controller 22 terminates the sequence of the series/parallel switching control. Note that a determination threshold is set in consideration of detection errors of the current sensor 21 so as not to make an erroneous determination based on the detection signal of the current sensor 21.

In step S6, the controller 22 turns on the first switching element S1. Thus, the operation in step S6 is completed, and the sequence of the series/parallel switching control ends.

As is clear from the above description, in the series/parallel switching control according to the embodiment of the disclosure, when the connection state of the first battery B1 and the second battery B2 is switched from the series connection state to the parallel connection state, the controller 22 performs a series/parallel switching transition control, so that the voltage VH of the smoothing capacitor $C_H$ is decreased to the higher of the voltage VB1 of the first battery B1 and the voltage VB2 of the second battery B2. In the series/parallel switching transition control, the controller 22 alternately turns on and turns off the second switching element S2 and the third switching element S3 while making the ON duration of the second switching element S2 shorter and the ON duration of the third switching element S3 longer with the passage of time. Also in the series/parallel switching control according to the embodiment of the disclosure, the controller 22 turns on the first switching element S1 after the diode of the first switching element S1 is energized. Thus, it is possible to restrain the inrush current from occurring when the connection state of the first battery B1 and the second battery B2 is switched from the series connection state to the parallel connection state.

More specifically, when the connection state of the first battery B1 and the second battery B2 is switched from the series connection state to the parallel connection state, the first battery B1, the second battery B2, and the smoothing capacitor $C_H$ are connected in parallel. Therefore, the higher of the voltage VB1 of the first battery B1 and the voltage VB2 of the second battery B2 is applied to the smoothing capacitor $C_H$, and the inrush current flows into the battery having the lower voltage. In the configuration shown in FIG. 2, the reactor element R is arranged on the second battery B2 side. Therefore, in general, the voltage of first battery B1 becomes higher than the voltage of second battery B2 and the inrush current attempts to flow into second battery B2. However, with the reactor element R, the inrush current is restrained from flowing into the second battery B2. However, depending on the situation, the voltage VB1 of the first battery B1 may be lower than the voltage VB2 of the second battery B2. In this case, the inrush current flows into the first battery B1 since there is no reactor element on the first battery B1 side. Thus, in the present embodiment, the control described above is performed in order to restrain the inrush current from flowing into the first battery B1 even when the voltage VB1 of the first battery B1 is lower than the voltage VB2 of the second battery B2. With the voltage VB1 of the first battery B1 being higher than the voltage VB2 of the second battery B2, that is, the diode of the first switching element S1 being energized, no inrush current occurs even if the connection state of the first battery B1 and the second battery B2 becomes the parallel connection state.

Although the embodiment to which the disclosure made by the present inventors is applied has been described above, the description and the drawings regarding the embodiment, which constitute a part of the disclosure, do not limit the disclosure. That is, other embodiments, examples, operation techniques and the like conceived by those skilled in the art based on the embodiment are all included in the scope of the disclosure.

What is claimed is:

1. A power supply for a vehicle, the power supply comprising:
    a first switching element connected between a positive line and a first node;
    a second switching element connected between the first node and a second node;
    a third switching element connected between the second node and a negative line;
    a first battery having a positive electrode and a negative electrode connected to the first node and the negative line, respectively;
    a reactor element connected between the positive line and a third node;
    a second battery having a positive electrode and a negative electrode connected to the third node and the second node, respectively;
    a smoothing capacitor connected between the positive line and the negative line; and
    a controller configured to switch each of the first switching element, the second switching element, and the third switching element between an ON state and an OFF state to switch a connection state of the first battery and the second battery between a series connection state and a parallel connection state,
    when the connection state of the first battery and the second battery is switched from the series connection state to the parallel connection state, the controller being configured to perform a transition control so that a voltage of the smoothing capacitor is decreased to a higher of a voltage of the first battery and a voltage of the second battery, and perform a switching control to turn on the first switching element after a diode of the first switching element is energized, the transition control being a control to alternately turn on and turn off the second switching element and the third switching element while making an ON duration of the second switching element shorter and an ON duration of the third switching element longer with passage of time.

2. The power supply according to claim 1, wherein:
    the controller is configured to control the first switching element and the third switching element to the OFF state and control the second switching element to the ON state so that the connection state of the first battery and the second battery becomes the series connection state; and
    the controller is configured to control the first switching element and the third switching element to the ON state and control the second switching element to the OFF state so that the connection state of the first battery and the second battery becomes the parallel connection state.

3. The power supply according to claim 1, wherein the controller is configured to perform the switching control when the voltage of the first battery is lower than the voltage of the second battery.

4. The power supply according to claim 1, wherein the controller is configured to maintain the connection state of the first battery and the second battery as the series connection state when the diode of the first switching element is not energized.

5. A control method of a power supply,
    the power supply including a first switching element, a second switching element, a third switching element, a first battery, a reactor element, a second battery, a smoothing capacitor, and a controller,
    the first switching element connecting between a positive line and a first node,
    the second switching element connecting between the first node and a second node,
    the third switching element connecting between the second node and a negative line,
    the first battery having a positive electrode and a negative electrode connected to the first node and the negative line, respectively, the reactor element connecting between the positive line and a third node, the second battery having a positive electrode and a negative electrode connected to the third node and the second node, respectively, the smoothing capacitor connecting between the positive line and the negative line, the control method comprising:

switching, by the controller, each of the first switching element, the second switching element, and the third switching element between an ON state and an OFF state to switch a connection state of the first battery and the second battery between a series connection state and a parallel connection state; and when the connection state of the first battery and the second battery is switched from the series connection state to the parallel connection state, performing, by the controller, a transition control so that a voltage of the smoothing capacitor is decreased to a higher of a voltage of the first battery and a voltage of the second battery, and performing, by the controller, a switching control to turn on the first switching element after a diode of the first switching element is energized, the transition control being a control to alternately turn on and turn off the second switching element and the third switching element while making an ON duration of the second switching element shorter and an ON duration of the third switching element longer with passage of time.

* * * * *